Patented Feb. 8, 1944

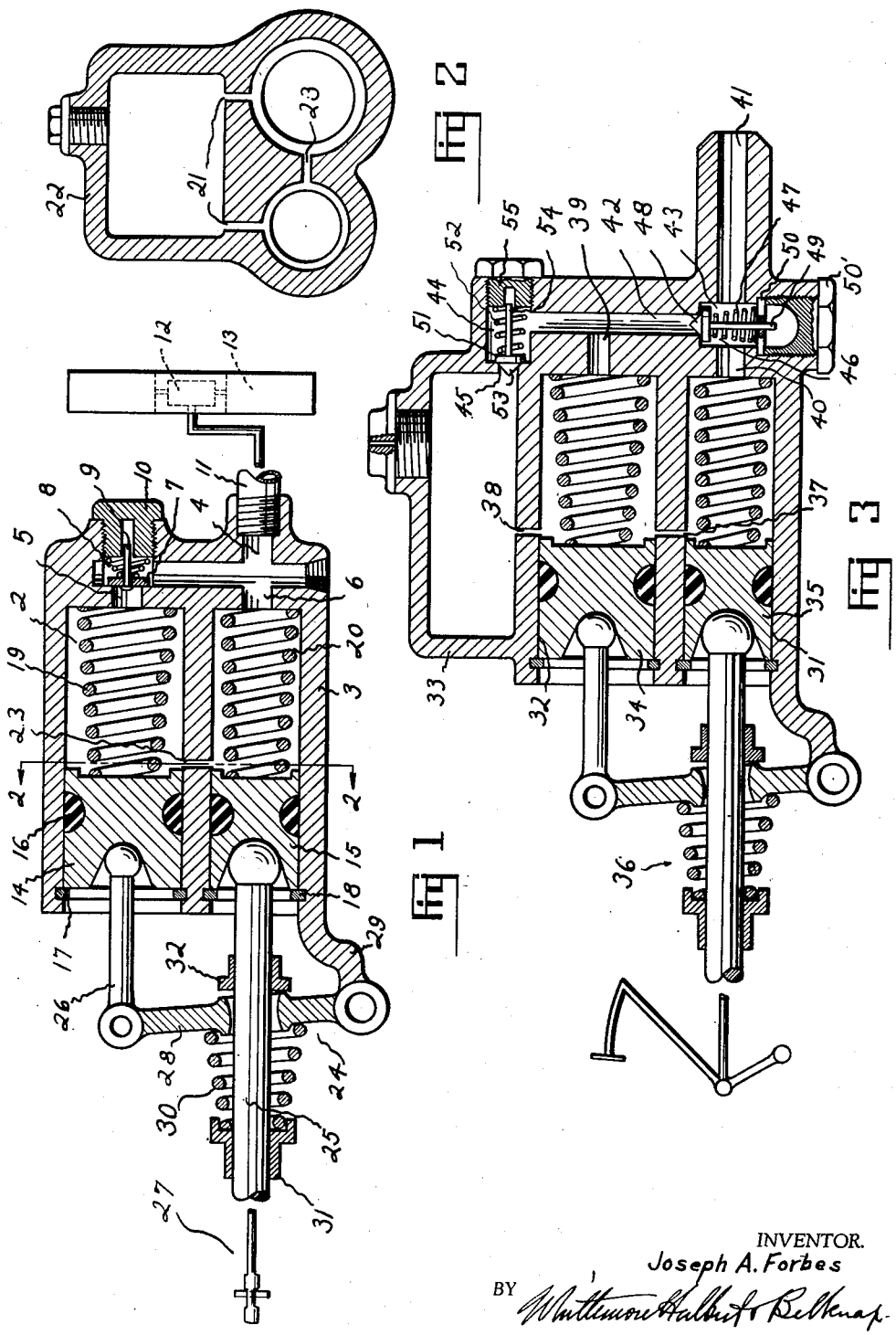

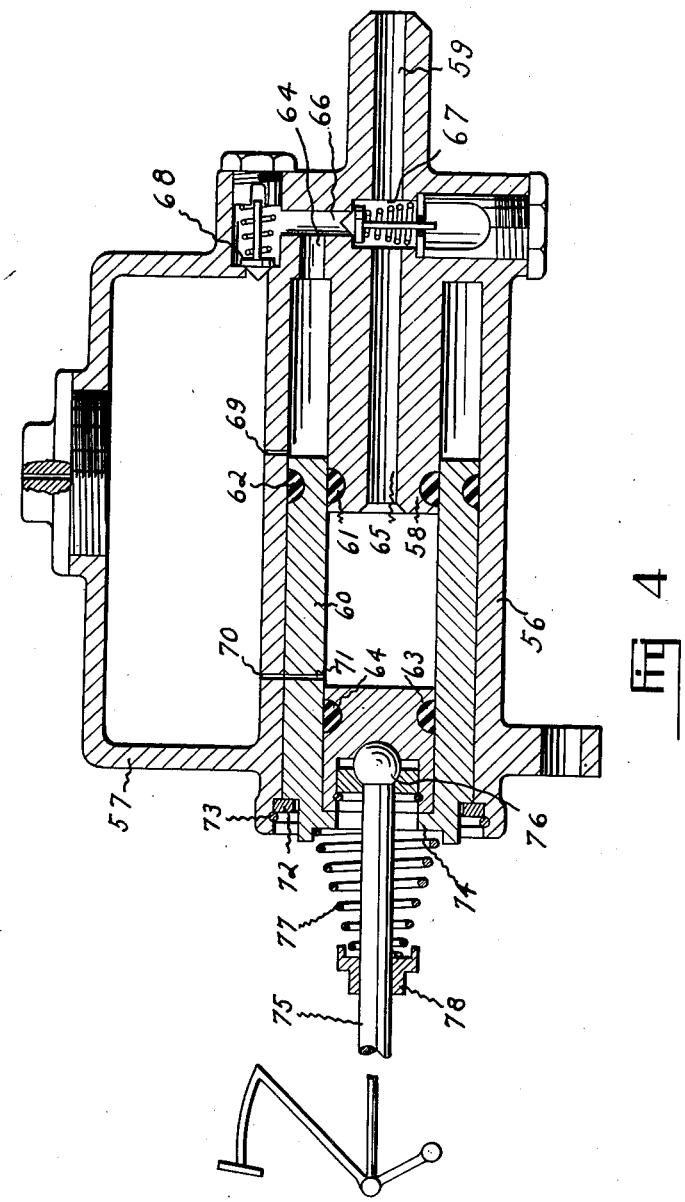

2,341,318

UNITED STATES PATENT OFFICE 2,341,318

MASTER CYLINDER

Joseph A. Forbes, Detroit, Mich., assignor to Kelsey-Hayes Wheel Company, Detroit, Mich., a corporation of Delaware Application February 16, 1942, Serial No. 431,147

7 Claims. (Cl. 60—54.6)

The invention relates to master cylinders and refers more particularly to master cylinders for use in hydraulic brake systems of motor vehicles, airplanes, and the like.

The invention has for one of its objects to provide an improved master cylinder which is constructed to discharge a relatively large volume of braking fluid under relatively low pressure to the brake system during the first portion of the brake applying movement and a relatively small volume of braking fluid under relatively high pressure during the final portion of the brake applying movement.

The invention has for another object to construct the master cylinder with two cylinders and pistons reciprocable therewithin and adapted to be advanced by a simple actuating mechanism.

With these and other objects in view, the invention resides in the novel features of construction and combinations and arrangements of parts as more fully hereinafter set forth.

In the drawings:

Figure 1 is a sectional view illustrating a master cylinder embodying the invention;

Figure 2 is a cross section on the line 2—2 of Figure 1;

Figures 3 and 4 are vertical sections illustrating other embodiments of the invention.

The master cylinder of Figures 1 and 2 comprises the cylinder member 1 having the substantially parallel cylinders 2 and 3, the outlet 4 and the discharge ports 5 and 6 leading from the cylinders 2 and 3, respectively, to the outlet.

The cylinder 2 is of greater diameter and volumetric capacity than the cylinder 3 so that the cylinder 2 may be designated as a low pressure cylinder and the cylinder 3 as a high pressure cylinder. The discharge port 5 is normally closed by the disc valve 7 under the influence of the spiral spring 8 encircling the stem 9 of the valve and located between the valve disc and the plug 10 in the end of the cylinder member. The plug is slidably receives the guides the valve stem. The outlet 4 is in communication with the hydraulic brake system of a motor vehicle which includes a pipe leading from the outlet to each of the wheel cylinders of each wheel brake. As illustrated in the present instance, a pipe 11 leads from the outlet 4 to the wheel cylinder 12 for actuating the brake shoes 13 of a wheel brake, the wheel cylinder and brake shoes being of standard construction and the brake shoes being normally held in their off position by a standard construction of retracting spring.

The master cylinder also comprises the pistons 14 and 15 reciprocable within the cylinders 2 and 3, respectively, the pistons being provided with the sealing rings 16 for preventing escape of the braking fluid or liquid. The pistons are resiliently held in their retracted or off positions against the transversely split stop rings 17 and 18 by the coil springs 19 and 20 within the cylinders 2 and 3, respectively. When the pistons are in these positions the cylinders 2 and 3 communicate through the ports 21 with the braking fluid or liquid reservoir 22 which is directly above the cylinders. Also the cylinders preferably communicate with each other through the port 23.

The pistons are advanced by means of the actuating mechanism 24 which comprises the actuating rods 25 and 26 which are movable generally longitudinally and have their rear ends ball-shaped and abutting the pistons. The rod 25 is pivotally connected at its front end to the brake pedal 27 of the motor vehicle. The rod 26 is pivotally connected at its front end to the free end of the lever 28 having its other end pivotally mounted upon the projection 29 of the cylinder member 1. The lever has intermediate its ends an enlarged portion which is apertured to freely receive the rod 25. A coil spring 30 encircles the rod 25 and abuts the collar 31 fixed on the rod 25 and also abuts the enlargement of the lever to normally hold the enlargement against the collar 32, which latter is also fixed on the rod 25. The spring 30 has a strength greater than the combined strength of the low pressure piston retracting spring 19 and the brake shoe retracting spring means so that when the brake pedal 27 is depressed both pistons will be advanced until the pressure of the braking fluid or liquid in the outlet 4 has reached a predetermined point, at which time all braking clearances will be taken up. At this time the spring 30 will yield and the valve 7 will close so that upon continued depression of the foot pedal the braking fluid or liquid will be discharged from the high pressure cylinder 3 only to apply the brakes.

It will be noted that the construction of the piston actuating mechanism is very simple. Also that the arrangement is such that the low pressure piston is advanced at a faster rate than the high pressure piston. Also that when a predetermined pressure of the braking fluid or liquid in the hydraulic brake system has been reached the low pressure cylinder communication with the brake system is cut off or closed and no further pressure is developed in this cylinder during the continued depression of the brake pedal. Furthermore, that the system is in communication with the reservoir in the retracted or off position of the pistons so that the system is replenished with braking fluid or liquid.

In the modified construction of master cylinder illustrated in Figure 3, the low pressure cylinder 32 is located above the high pressure cylinder 31 and the braking fluid or liquid reservoir 33 is above the low pressure cylinder. 34 and 35 are respectively the low pressure and high pressure pistons reciprocable within the low pressure and high pressure cylinders. These pistons are adapted to be advanced by the mechanism 36 which is the same as the actuating mechanism 24. The pistons are adapted to be returned to their retracted or off positions by coil springs corresponding to the coil springs 19 and 20. In the retracted or off positions of the pistons, the high pressure cylinder 31 communicates with the low pressure cylinder 32 through the port 37 and the low pressure cylinder 32 communicates with the reservoir 33 through the port 38. The low pressure and high pressure cylinders have the discharge ports 39 and 40, respectively, located in the end wall of the cylinder member and adapted to communicate with the common outlet 41 in the cylinder member through the passageway 42 also formed in the end wall of the cylinder member. This passageway extends vertically and has at its lower end the enlargement 43 and at its upper end the enlargement 44, which latter is adapted to communicate with the reservoir 33 through the outlet port 45. 46 is a valve located within the enlargement 43 and resiliently urged upwardly by the coil spring 47 and having the head 48 for closing the portion of the passageway 42 between the discharge ports 39 and 40. The valve also has the stem 49 which is guided by the spider 50 clamped in place by the nut 50'. 51 is a second valve located within the enlargement 44 and resiliently urged by the coil spring 52 in a direction such that its head 53 closes the outlet port 45. The valve has the stem 54 which is guided by the nut 55.

With this construction the low pressure and high pressure pistons 34 and 35 are advanced and retracted in the same manner as the corresponding pistons of Figures 1 and 2. During the advancement the valve 46 is opened by being depressed to permit the flow of the braking fluid or liquid from the low pressure cylinder until the pressure in the outlet 41 has reached a predetermined point. Also during this time the valve 51 is closed so that the braking fluid or liquid cannot be forced into the reservoir. During the retraction of the pistons the valve 51 opens to allow braking fluid or liquid to flow from the reservoir through the passageway and the low pressure cylinder discharge port into the low pressure cylinder. Also if the pressure differential is sufficient the valve 46 may be moved to open position to allow some of the braking fluid or liquid to enter the high pressure cylinder. Upon the complete retraction of the low pressure and high pressure pistons excess braking fluid or liquid may then flow through the ports 37 and 38 and return to the reservoir, the valves 46 and 51 being closed at this time.

Figure 4 discloses another modification of master cylinder in which the cylinder member is formed with the cylinder 56 and the reservoir 57 above the cylinder. The cylinder member is also formed with the cylindrical projection 58 which is concentric with the cylinder 56 and extends from the end having the common outlet 59. 60 is a piston member reciprocable within the cylinder 56 and within the annular space formed by the cylinder and the projection, there being a suitable sealing ring 61 located in an annular groove formed in the projection and engageable with the inner surface of the piston and a suitable sealing ring 62 located in an annular groove in the piston and engaging the cylinder. 63 is a second piston member reciprocable within the piston member 60, there being a suitable sealing ring 64 between the two piston members. With the construction as thus far described, the cylinder 56 forms a low pressure cylinder and the piston member 60 forms a high pressure cylinder, the former being adapted to communicate with the common outlet 59 through the discharge port 64 and the latter being adapted to communicate with the common outlet through the discharge port 65 which extends axially of the projection 58. For placing the discharge ports in communication with the common outlet, there is the vertical passageway 66 which is formed in the same manner as the vertical passageway 42 of Figure 3. 67 and 68 are springs formed and also operating in the same manner as the springs 46 and 51 of Figure 3.

For the purpose of permitting the excess braking fluid or liquid to return to the reservoir, the cylinder 56 is provided with the port 69 which places the the annular space formed by the cylinder 56 and the projection 58 in communication with the reservoir when the piston member 60 is in its retracted or off position. Also the cylinder 56 and the piston member 60 are provided with the ports 70 and 71 which are adapted to register when the piston members 60 and 63 are in their retracted or off positions and which place the interior of the piston member 60 in communication with the reservoir. The retracted or off position of the piston member 60 is determined by its abutment with the ring 72 which is locked in the cylinder by the split locking ring 73. The retracted or off position of the piston member 63 is determined by its abutment with the annular flange 74 of the piston member.

For actuating the piston members, I have provided the actuating rod 75 which is pivotally connected at its front end in the usual manner to the brake pedal of the motor vehicle. The rear end of this rod is preferably provided with the ball 76 which is positively connected to the high pressure piston member 63 to both advance and retract the same. 77 is a coil spring abutting the low pressure piston member 60 and the collar 78 fixedly secured to the rod 75, the arrangement being such that when the rod 75 is advanced it directly advances the high pressure piston member and advances the low pressure piston member until a predetermined pressure in the common outlet 59 sufficient to take up all braking clearances is reached. Then upon continued advancement of the rod 75, the coil spring collapses so that only the high pressure piston member is advanced.

What I claim as my invention is:

1. A master cylinder comprising two cylinders having discharge ports communicating with a common outlet, pistons reciprocable within said cylinders, actuating rods movable generally longitudinally in one direction to advance said pistons, a pivotal lever operatively connected to one of said rods to move the same in said direction, yieldable means between the other of said rods and said lever for moving the first mentioned rod in said direction to advance one of said pistons upon movement of the second mentioned rod to advance the other of said pistons, and a valve for closing the communication between the outlet and the discharge port of the cylinder within which said first mentioned piston is reciprocable.

2. A master cylinder comprising a low pressure cylinder and a high pressure cylinder each having a discharge port communicating with a common outlet, pistons reciprocable within said cylinders, an actuating rod movable generally longitudinally in one direction to advance the piston reciprocable within said high pressure cylinder, a pivotal lever operatively connected to the piston reciprocable within said low pressure cylinder to advance the same, yieldable means between said rod and lever to advance the last mentioned piston upon movement of said rod to advance the first mentioned piston, and a valve for closing the communication between the outlet and the discharge port of said low pressure cylinder.

3. A master cylinder comprising a cylinder member having a low pressure cylinder and a high pressure cylinder, a common outlet and discharge ports communicating with the outlet, pistons reciprocable within said cylinders, an actuating member movable in one direction to advance the piston reciprocable within said high pressure cylinder, a lever pivotally mounted upon said cylinder member and operatively connected to said piston reciprocable within said low pressure cylinder, yieldable means between said lever and actuating member for swinging said lever to advance said piston reciprocable within said low pressure cylinder upon movement of said actuating member to advance the piston within said high pressure cylinder, and a valve for closing the communication between the outlet and the discharge port of said low pressure cylinder.

4. A master cylinder comprising a cylinder member having a low pressure cylinder and a high pressure cylinder, an outlet and a discharge port for each of said cylinders communicating with said outlet, pistons reciprocable within said cylinders, an actuating member operatively connected to said piston reciprocable within said high pressure cylinder to advance said last mentioned piston, means for advancing said piston reciprocable within said low pressure cylinder upon movement of said actuating member to advance the piston reciprocable within said high pressure cylinder, said means including a lever pivotally mounted at one end upon said cylinder member and operatively connected at the other end to said piston reciprocable within said low pressure cylinder and a spring between said lever and actuating member, and a valve for closing the discharge port leading from said low pressure cylinder.

5. A master cylinder comprising two cylinders having discharge ports, a reservoir having an outlet port, a passageway for placing the discharge ports in communication with a common outlet and for placing the outlet port in communication with the discharge ports, pistons reciprocable within said cylinders, and valves in said passageway between the discharge ports and between one of the discharge ports and the outlet port.

6. A compound master cylinder unit comprising a low pressure chamber having a discharge port, a high pressure chamber having a discharge port, piston means in each of said chambers for discharging fluid therefrom, an outlet for the unit, a reservoir above said chambers having an outlet port, a passageway for placing the discharge ports in communication with the outlet and for placing the outlet port in communication with the discharge ports, a valve in said passageway adapted to open in one direction to permit flow of fluid from one of the discharge ports to the outlet and to prevent flow of fluid in the opposite direction, and a second valve in said passageway adapted to open in one direction to permit flow of fluid from the outlet port and to prevent flow of fluid in the opposite direction.

7. A master cylinder comprising a cylinder member having an outlet and two discharge ports, a reservoir having an outlet port, a cylinder provided with one of the discharge ports, a piston member reciprocable within said cylinder and adapted to force braking fluid through its discharge port, a piston member reciprocable within said first mentioned piston member and adapted to force braking fluid through the other of the discharge ports, said cylinder having a port for placing the interior of said cylinder in communication with said reservoir when said first mentioned piston member is in retracted position, said cylinder and first mentioned piston member having registering ports for placing the interior of said first mentioned piston member in communication with said reservoir when said pistons are in retracted position, a passageway for placing the discharge ports in communication with the outlet and for placing the outlet port in communication with the discharge ports, and valves in said passageway between the discharge ports and between one of the discharge ports and the outlet port.

JOSEPH A. FORBES.